(12) United States Patent
Nose et al.

(10) Patent No.: US 10,294,881 B2
(45) Date of Patent: May 21, 2019

(54) CONTROL APPARATUS FOR INTERNAL COMBUSTION ENGINE

(71) Applicant: TOYOTA JIDOSHA KABUSHIKI KAISHA, Toyota-shi (JP)

(72) Inventors: Yuki Nose, Kasugai (JP); Yoshiyuki Shogenji, Toyota (JP); Eiji Ikuta, Oobu (JP); Keiichi Myojo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 11 days.

(21) Appl. No.: 15/850,359

(22) Filed: Dec. 21, 2017

(65) Prior Publication Data
US 2018/0180016 A1 Jun. 28, 2018

(30) Foreign Application Priority Data
Dec. 26, 2016 (JP) .................. 2016-252101

(51) Int. Cl.
*F02D 41/02* (2006.01)
*F02P 5/15* (2006.01)
(Continued)

(52) U.S. Cl.
CPC ............. *F02D 41/024* (2013.01); *F02D 9/02* (2013.01); *F02D 11/105* (2013.01);
(Continued)

(58) Field of Classification Search
CPC ........ F02P 5/1514; F02P 5/045; F02P 5/1512; F02D 9/02; F02D 11/105; F02D 41/0002;
(Continued)

(56) References Cited

U.S. PATENT DOCUMENTS

| 4,467,765 A | 8/1984 | Suzuki et al. |
| 5,657,625 A * | 8/1997 | Koga ................. B01D 53/9495 60/274 |

(Continued)

FOREIGN PATENT DOCUMENTS

| JP | 6-137242 | 5/1994 |
| JP | 2012-57492 | 3/2012 |

*Primary Examiner* — Mahmoud Gimie
(74) *Attorney, Agent, or Firm* — Oblon, McClelland, Maier & Neustadt, L.L.P.

(57) ABSTRACT

In a control apparatus for an internal combustion engine, The ignition timing in a rich-cylinder is corrected toward a retardation side from a theoretical-MBT such that the torque generated in the rich-cylinder exceeds a torque generated in the rich-cylinder at the theoretical-MBT, and the ignition timing in a lean-cylinder is corrected toward an advancement side from the theoretical-MBT such that the torque generated in the lean-cylinder exceeds a torque generated in the lean-cylinder at the theoretical-MBT, when a temperature raising process is being executed, and the ignition timing in the rich-cylinder is corrected further toward the retardation side such that the torque generated in the rich-cylinder becomes equal to or smaller than a maximum theoretical generated torque and equal to or larger than the torque generated in the lean-cylinder at the theoretical-MBT, when the temperature raising process is being executed and the engine is in a low-load operating state.

6 Claims, 9 Drawing Sheets

(51) Int. Cl.
  *F02D 9/02* (2006.01)
  *F02D 41/30* (2006.01)
  *F02D 41/00* (2006.01)
  *F02D 41/14* (2006.01)
  *F02D 41/34* (2006.01)
  *F02P 5/04* (2006.01)
  *F02D 11/10* (2006.01)

(52) U.S. Cl.
  CPC ..... *F02D 41/0002* (2013.01); *F02D 41/0082* (2013.01); *F02D 41/1475* (2013.01); *F02D 41/3005* (2013.01); *F02D 41/34* (2013.01); *F02P 5/045* (2013.01); *F02P 5/1512* (2013.01); *F02P 5/1514* (2013.01); *F02D 2009/0237* (2013.01); *F02D 2200/602* (2013.01); *Y02T 10/26* (2013.01); *Y02T 10/42* (2013.01); *Y02T 10/44* (2013.01); *Y02T 10/46* (2013.01)

(58) Field of Classification Search
  CPC ............... F02D 41/0082; F02D 41/024; F02D 41/1475; F02D 41/3005; F02D 41/34; F02D 2009/0237; F02D 2200/602
  USPC ............................................ 123/305, 406.47
  See application file for complete search history.

(56) References Cited

U.S. PATENT DOCUMENTS

| | | | |
|---|---|---|---|
| 6,237,330 B1* | 5/2001 | Takahashi | B01D 53/9495 60/285 |
| 8,150,598 B2* | 4/2012 | Nakagawa | F02D 35/023 123/406.47 |
| 2005/0109318 A1 | 5/2005 | Ichihara et al. | |

\* cited by examiner

CONTROL APPARATUS FOR INTERNAL COMBUSTION ENGINE

CROSS-REFERENCE TO RELATED APPLICATIONS

This application claims priority to Japanese Patent Application No. 2016-252101 filed on Dec. 26, 2016, which is incorporated herein by reference in its entirety.

BACKGROUND

1. Technical Field

The disclosure relates to a control apparatus for an internal combustion engine.

2. Description of Related Art

There is known a temperature raising process for raising the temperature of a catalyst to a temperature at which the catalyst is activated or regenerated to suppress the deterioration in emission properties of exhaust gas from an internal combustion engine. For example, it is described in Japanese Patent Application Publication No. 2012-057492 (JP 2012-057492 A) that at least one of a plurality of cylinders of an internal combustion engine is controlled to a rich cylinder whose air-fuel ratio is rich, and each of the other remaining cylinders is controlled to a lean cylinder whose air-fuel ratio is lean, as the temperature raising process.

Besides, as another temperature raising process, there is also known a process of repeatedly changing over the air-fuel ratio of all cylinders of an internal combustion engine to a rich air-fuel ratio or a lean air-fuel ratio. In this temperature raising process, the rotational speed of the internal combustion engine increases when the air-fuel ratio is controlled to the rich air-fuel ratio, and the rotational speed of the internal combustion engine decreases when the air-fuel ratio is controlled to the lean air-fuel ratio. As a result of such fluctuations in the rotational speed, the amplitude of vibrations of the internal combustion engine may increase to cause a deterioration in drivability. For example, it is described in Japanese Patent Application Publication No. 6-137242 (JP 6-137242 A) that the ignition timing is corrected to be retarded such that the rotational speed of the internal combustion engine is restrained from increasing when the air-fuel ratio is controlled to the rich air-fuel ratio, and the ignition timing is corrected to be advanced such that the rotational speed of the internal combustion engine is restrained from decreasing when the air-fuel ratio is controlled to the lean air-fuel ratio, with a view to suppressing this deterioration in drivability.

SUMMARY

In the temperature raising process of Japanese Patent Application Publication No. 2012-057492 (JP 2012-057492 A) as well, the torque generated in each rich cylinder increases, and the torque generated in each lean cylinder decreases, so torque fluctuations are caused. As a result, the amplitude of vibrations of the internal combustion engine may increase to cause a deterioration in drivability. Therefore, as in Japanese Patent Application Publication No. 6-137242 (JP 6-137242 A), it is conceivable to restrain the internal combustion engine from vibrating by correcting the ignition timing in a retarding manner such that the torque generated in each rich cylinder is restrained from increasing, and correcting the ignition timing in an advancing manner such that the torque generated in each lean cylinder is restrained from decreasing. However, when the ignition timing in each rich cylinder is corrected to be retarded to such an extent that the difference between the torque generated in each rich cylinder and the torque generated in each lean cylinder becomes sufficiently small with a view to restraining the internal combustion engine from vibrating, the torque generated in each rich cylinder may substantially decrease to cause a deterioration in fuel economy.

Thus, in view of the aforementioned circumstances, the disclosure provides a control apparatus for an internal combustion engine that also suppresses the deterioration in fuel economy while suppressing the deterioration in drivability.

According to one aspect of the disclosure, a control apparatus for an internal combustion engine that is equipped with an electronic control unit is provided. This electronic control unit is configured as follows. That is, the electronic control unit is configured to (i) calculate a theoretical ignition timing, which is an ignition timing when a torque generated in each of cylinders belonging to the internal combustion engine as a motive power source of a vehicle is equal to a maximum theoretical generated torque when an air-fuel ratio in each of the cylinders is controlled to a theoretical air-fuel ratio, (ii) control at least one of the plurality of the cylinders to a rich cylinder whose air-fuel ratio is equal to a rich air-fuel ratio that is smaller than the theoretical air-fuel ratio, control the cylinders other than the at least one of the plurality of the cylinders to lean cylinders whose air-fuel ratio is equal to a lean air-fuel ratio that is larger than the theoretical air-fuel ratio, and determine whether or not a temperature raising process for raising a temperature of a catalyst that purifies exhaust gas is being executed, (iii) execute a first ignition correction, which is a correction for correcting an ignition timing in the rich cylinder toward a retardation side from the theoretical ignition timing such that the torque generated in the rich cylinder exceeds the torque generated in the rich cylinder at the theoretical ignition timing, and correcting an ignition timing in each of the lean cylinders toward an advancement side from the theoretical ignition timing such that the torque generated in each of the lean cylinders exceeds the torque generated in each of the lean cylinders at the theoretical ignition timing, when the temperature raising process is being executed, and (iv) execute a second ignition correction, which is a correction for correcting the ignition timing in the rich cylinder further toward the retardation side such that the torque generated in the rich cylinder becomes equal to or smaller than the maximum theoretical generated torque and equal to or larger than the torque generated in each of the lean cylinders at the theoretical ignition timing, in addition to the correction according to the first ignition correction, when the temperature raising process is being executed and the internal combustion engine is in a low-load operating state.

In the case where the internal combustion engine is in the low-load operating state, the internal combustion engine is in, for example, idling operation. A driver is considered to be likely to recognize vibrations of the internal combustion engine resulting from the execution of the temperature raising process. Therefore, according to the control apparatus for the internal combustion engine as described above, the respective ignition timings are corrected such that the torque generated in the rich cylinder decreases and the torque generated in each of the lean cylinders increases, in the low-load operating state. Therefore, the generated torque can be restrained from fluctuating between the rich cylinder and each of the lean cylinders, and the deterioration in drivability can be suppressed. Besides, in this case, the torque generated in the rich cylinder decreases to cause a deterioration in fuel economy. In the low-load operating state, however, the amount of fuel consumption is small in the first place, so the influence on the deterioration in fuel economy is small. On the other hand, in the case of a state other than the low-load operating state, for example, an intermediate-load operating state or a high-load operating state in which the vehicle runs at high speed, the driver is considered to be less likely to recognize vibrations of the internal combustion engine resulting from the execution of the temperature raising process than in the case of the low-load operating state. Besides, in the intermediate-load operating state or the high-load operating state, it is desirable to suppress the deterioration in fuel economy by ensuring the output of the internal combustion engine. Therefore, the respective ignition timings are corrected such that the respective torques generated in the rich and lean cylinders increase, so the deterioration in fuel economy can be suppressed.

Besides, in the control apparatus, the electronic control unit may be configured to correct the ignition timing in the rich cylinder such that the torque generated in each of the lean cylinders in which the ignition timing is corrected through the first ignition correction coincides with the torque generated in the rich cylinder, in the second ignition correction.

Besides, the electronic control unit may be configured to execute a correction for increasing an opening degree of a throttle of the internal combustion engine more when the temperature raising process is being executed than when the temperature raising process is stopped.

Besides, the electronic control unit may be configured to more greatly correct an amount of increase in the opening degree of the throttle in a case of the low-load operating state than in a case other than the low-load operating state, in the throttle opening degree correction.

Besides, the electronic control unit may be configured to correct the ignition timing in each of the lean cylinders to an ignition timing at which the torque generated in each of the lean cylinders is maximized, in the first ignition correction.

Still further, the electronic control unit may be configured to correct the ignition timing in the rich cylinder to an ignition timing at which the torque generated in the rich cylinder is maximized, in the first ignition correction.

As described above, the control apparatus for the internal combustion engine according to the disclosure can also suppress the deterioration in fuel economy while suppressing the deterioration in drivability of the vehicle.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
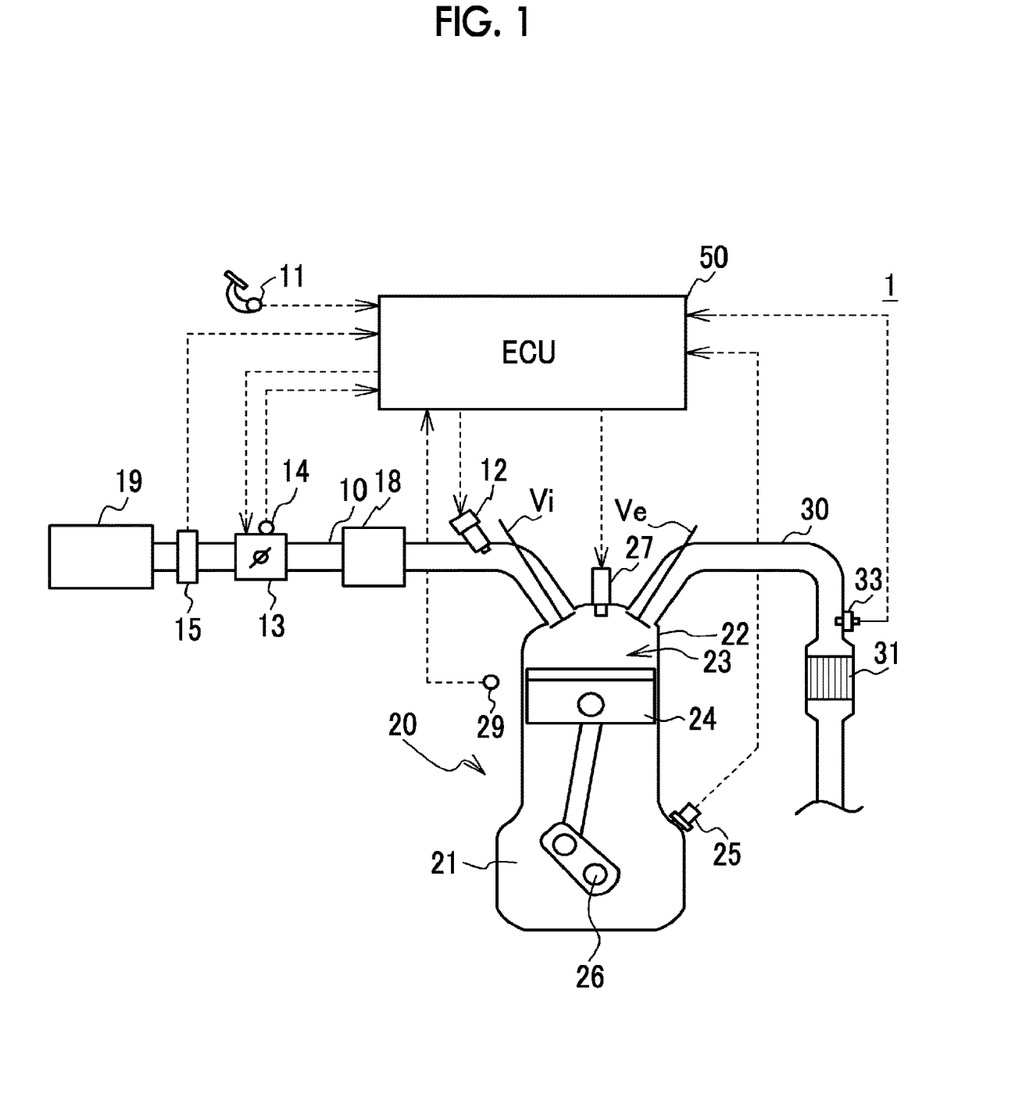
FIG. 1 is a schematic configuration view of a vehicle having a control apparatus for an internal combustion engine according to the embodiment of the disclosure as an example thereof.

FIG. 1 is a schematic configuration view of a vehicle 1. The vehicle 1 is mounted with an internal combustion engine (hereinafter referred to as an engine) 20 as a motive power source for running, and is also mounted with a three-way catalyst 31 that purifies exhaust gas from the engine 20. In the engine 20, an air-fuel mixture is burned in a combustion chamber 23 of a cylinder head 22 that is arranged on an upper portion of a cylinder block 21, and a piston 24 is thereby moved in a reciprocating manner. The engine 20 is an in-line four-cylinder engine having four cylinders, but is not limited thereto as long as it has a plurality of cylinders.

An intake valve Vi that opens/closes an intake port, and an exhaust valve Ve that opens/closes an exhaust port are provided for each of the cylinders in the cylinder head 22 of the engine 20. Besides, an ignition plug 27 for igniting the air-fuel mixture in the combustion chamber 23 is attached to a top portion of the cylinder head 22 for each of the cylinders.

The intake port of each of the cylinders is connected to a surge tank 18 via a branch pipe for each of the cylinders. An intake pipe 10 is connected upstream of the surge tank 18, and an air cleaner 19 is provided at an upstream end of the intake pipe 10. Moreover, the intake pipe 10 is provided, sequentially from an upstream side thereof, with an airflow meter 15 for detecting an amount of intake air, and an electronically controlled throttle valve 13.

Besides, a fuel injection valve 12 that injects fuel into the intake port is installed in the intake port of each of the cylinders. The fuel injected from the fuel injection valve 12 is mixed with intake air to constitute the air-fuel mixture. This air-fuel mixture is sucked into the combustion chamber 23, compressed by the piston 24, and burned through ignition by the ignition plug 27 when the intake valve Vi is open. Incidentally, instead of the fuel injection valve 12 that injects fuel into the intake port, a fuel injection valve that directly injects fuel into each of the cylinders may be provided, or fuel injection valves that inject fuel into the intake port and each of the cylinders respectively may be both provided.

On the other hand, the exhaust port of each of the cylinders is connected to an exhaust pipe 30 via the branch pipe for each of the cylinders. The exhaust pipe 30 is provided with the three-way catalyst 31. The three-way catalyst 31 has an oxygen occlusion capacity, and purifies NOx, HC, and CO. The three-way catalyst 31 is obtained by forming one or a plurality of catalytic layers on, for example, a substrate such as cordierite or the like, especially on a honeycomb substrate. Each of the catalytic layers includes a catalyst carrier such as alumina ($Al_2O_3$) or the like, and a catalyst metal such as platinum (Pt), palladium (Pd), rhodium (Rh) or the like carried on the catalyst carrier. The three-way catalyst 31 is an exemplary catalyst that purifies the exhaust gas discharged from the plurality of the cylinders belonging to the engine 20. The three-way catalyst 31 may be an oxidation catalyst, or a gasoline particulate filter that is coated with an oxidation catalyst.

An air-fuel ratio sensor 33 for detecting an air-fuel ratio of exhaust gas is installed upstream of the three-way catalyst 31. The air-fuel ratio sensor 33 is a so-called wide-range air-fuel ratio sensor. The air-fuel ratio sensor 33 can continuously detect an air-fuel ratio ranging over a relatively wide range, and outputs a signal having a value proportional to the air-fuel ratio.

The vehicle 1 is equipped with a control apparatus for controlling the engine 20 that is mounted in the vehicle 1. Moreover, this control apparatus is equipped with an electronic control unit (an ECU) 50. The ECU 50 as an exemplary ECU belonging to the control apparatus is equipped with a central processing unit (a CPU), a random access memory (a RAM), a read only memory (a ROM), a storage device, and the like. The ECU 50 controls the engine 20 by executing a program stored in the ROM and the storage device. Besides, the ECU 50 performs predetermined control that will be described later. This control is realized by a calculation unit, a determination unit, a first ignition correction unit, a second ignition correction unit, and a throttle opening degree correction unit of the ECU 50, which are functionally realized by the CPU, the ROM, and the RAM. The details will be described later.

The above-mentioned ignition plug 27, the above-mentioned throttle valve 13, the above-mentioned fuel injection valve 12, and the like are electrically connected to the ECU 50. Besides, an accelerator depression amount sensor 11 that detects an accelerator depression amount, a throttle opening degree sensor 14 that detects a throttle opening degree of the throttle valve 13, the airflow meter 15 that detects an amount of intake air, the air-fuel ratio sensor 33, a crank angle sensor 25 that detects a crank angle of a crankshaft 26, a coolant temperature sensor 29 that detects a temperature of coolant of the engine 20, and various other sensors are electrically connected to the ECU 50 via A/D converters (not shown) and the like. The ECU 50 controls the ignition plug 27, the throttle valve 13, the fuel injection valve 12 and the like to control the ignition timing, the fuel injection amount, the fuel injection timing, the throttle opening degree and the like respectively, such that a desired output is obtained, based on detection values of the various sensors and the like.

Next, the setting of a target air-fuel ratio by the ECU 50 will be described. The target air-fuel ratio is set in accordance with the state of the engine 20. In a normal operating state that is not transient but steady, the target air-fuel ratio is set to a theoretical air-fuel ratio. When the target air-fuel ratio is set, the amount of fuel injection to each of the cylinders is controlled through feedback such that the air-fuel ratio detected by the air-fuel ratio sensor 33 coincides with the target air-fuel ratio.

Besides, the ECU 50 executes a temperature raising process for raising the temperature of the three-way catalyst 31 to a temperature at which the three-way catalyst 31 is activated or a temperature at which sulfur compounds (SOx) deposited in the three-way catalyst 31 are desorbed. In the temperature raising process, so-called dither control for controlling the air-fuel ratio in one of the plurality of the cylinders to a rich air-fuel ratio that is smaller than the theoretical air-fuel ratio and controlling the air-fuel ratio in each of the other three remaining cylinders to a lean air-fuel ratio that is larger than the theoretical air-fuel ratio is performed.

In controlling the air-fuel ratios in the temperature raising process, concretely, the air-fuel ratio in one of the cylinders is controlled to the rich air-fuel ratio by correcting the amount of fuel injection corresponding to the above-mentioned target air-fuel ratio in an increasing manner at a predetermined ratio, and the air-fuel ratio in each of the other remaining cylinders is controlled to the lean air-fuel ratio by correcting the amount of fuel injection corresponding to the target air-fuel ratio in a decreasing manner at a predetermined ratio. Besides, when the ratio of increase/decrease is equal to, for example, 20%, the air-fuel ratio in one of the cylinders is controlled to the rich air-fuel ratio by correcting the amount of fuel injection corresponding to the target air-fuel ratio in an increasing manner by 15%, and the air-fuel ratio in each of the other three remaining cylinders is controlled to the lean air-fuel ratio by correcting the amount of fuel injection in a decreasing manner by 5%. By prescribing the ratio of increase and the ratio of decrease in this manner, the average of the air-fuel ratios of all the cylinders is held equal to the theoretical air-fuel ratio. When the temperature raising process is executed in this manner, the surplus fuel discharged from the cylinder whose air-fuel ratio is controlled to the rich air-fuel ratio adheres to the three-way catalyst 31, and burns under a lean atmosphere resulting from the exhaust gas discharged from the cylinders whose air-fuel ratio is controlled to the lean air-fuel ratio. Thus, the temperature of the three-way catalyst 31 is raised. Incidentally, when the execution of the temperature raising process is started, a temperature raising execution flag is switched from OFF to ON.

Incidentally, the ratio of increase/decrease to the amount of fuel injection in the temperature raising process may be changed in accordance with the operating state of the engine 20. For example, the ratio of increase/decrease may be controlled to be increased when the rotational speed of the engine 20 is in an intermediate rotation range or when the load of the engine 20 is in an intermediate load range, and the ratio of increase/decrease may be controlled to be reduced when the rotational speed of the engine 20 is in a low rotation range or a high rotation range or when the load of the engine 20 is in a low load range or a high load range. Besides, in the temperature raising process, the ratio of increase and the ratio of decrease are controlled such that the average of the air-fuel ratios of all the cylinders becomes equal to the theoretical air-fuel ratio, but the disclosure is not limited thereto as long as the average air-fuel ratio is confined within a predetermined range including the theoretical air-fuel ratio and the temperature of the three-way catalyst 31 can be raised.

Incidentally, according to the present embodiment of the disclosure, in the temperature raising process, the air-fuel ratio in the cylinder #1 as one of the four cylinders #1 to #4 that are arranged in line is controlled to the rich air-fuel ratio, and the air-fuel ratio in each of the other remaining cylinders #2 to #4 is controlled to the lean air-fuel ratio. In the present specification, the cylinder #1 whose air-fuel ratio is controlled to the rich air-fuel ratio in the temperature raising process is referred to as the rich cylinder #1, and the cylinders #2 to #4 whose air-fuel ratio is controlled to the lean air-fuel ratio are referred to as the lean cylinders #2 to #4 respectively.

Besides, the ECU 50 performs control for correcting the ignition timing and correcting the throttle opening degree in an increasing manner as this temperature raising process is executed. This control will be described hereinafter.

Figure 2:
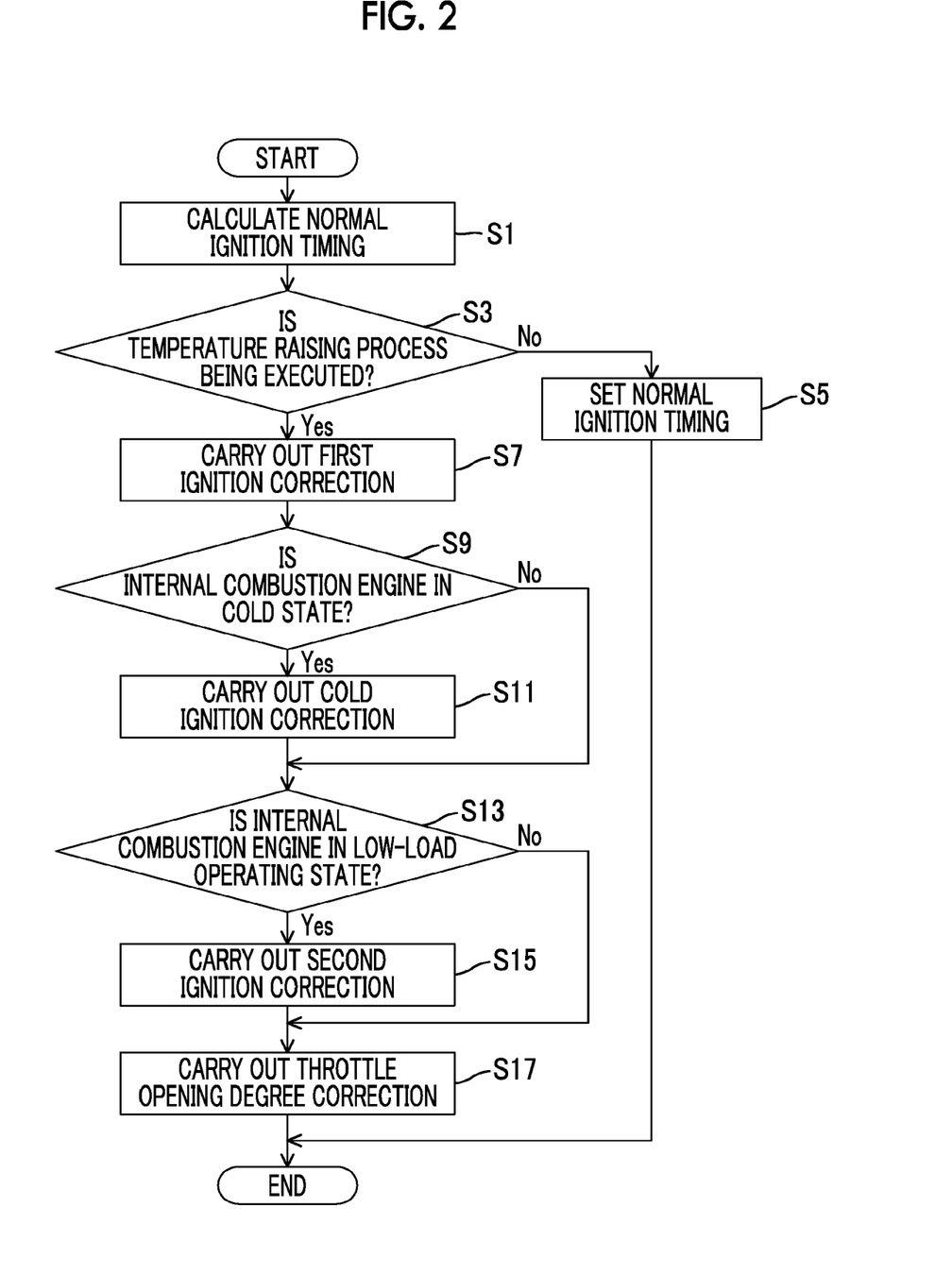
FIG. 2 is a flowchart showing an example of control that is performed by an electronic control unit (hereinafter referred to as an ECU) with which the control apparatus according to the embodiment of the disclosure is equipped.

FIG. 2 is a flowchart showing an example of the control that is performed by the ECU 50. The flowchart of FIG. 2 is repeatedly executed at intervals of a predetermined period. First of all, a normal ignition timing is calculated from a rotational speed of the engine 20 and a load of the engine 20 (step S1). The rotational speed of the engine 20 is acquired based on a detection value of the crank angle sensor 25, and the load of the engine 20 is acquired based on a detection value of the airflow meter 15. The normal ignition timing is an ignition timing in a state where the temperature raising process is not executed, and is an ignition timing at which the torque generated in each of the cylinders is maximized, namely, a minimum advance for best torque (hereinafter referred to as an MBT). The MBT is a timing that differs depending on the air-fuel ratio. In the normal operating state, all the cylinders are controlled to the same ignition timing. In the present embodiment of the disclosure, a case where the target air-fuel ratio at the time of normal operation is controlled to the theoretical air-fuel ratio will be described, and the MBT at which the generated torque is maximized at the theoretical air-fuel ratio will be referred to as a theoretical ignition timing, namely, a theoretical minimum advance for best torque (hereinafter referred to as the theoretical MBT). The process in step S1 is an exemplary process that is executed by the calculation unit that calculates the theoretical MBT as an ignition timing at which the torque generated in each of the cylinders in controlling the air-fuel ratio in each of the plurality of the cylinders #1 to #4 belonging to the engine 20 as a motive power source of the vehicle 1 to the theoretical air-fuel ratio is equal to a maximum theoretical generated torque.

Subsequently, it is determined, based on the temperature raising execution flag, whether or not the temperature raising process is being executed (step S3). The process of step S3 is an exemplary process that is executed by the determination unit that controls at least one cylinder #1 of the plurality of the cylinders #1 to #4 to the rich cylinder whose air-fuel ratio is equal to the rich air-fuel ratio smaller than the theoretical air-fuel ratio, that controls each of the cylinders #2 to #4 other than the at least one cylinder #1 to the lean cylinder whose air-fuel ratio is equal to the lean air-fuel ratio larger than the theoretical air-fuel ratio, and that determines whether or not the temperature raising process for raising the temperature of the three-way catalyst 31 that purifies exhaust gas is being executed. If the result of the determination in step S3 is negative, the ignition timing of each of the cylinders is set to the MBT calculated in step S1 (step S5). In concrete terms, the ignition timing of each of the cylinders is set to the theoretical MBT. Thus, the deterioration in fuel economy is suppressed when the temperature raising process is not executed.

If the result of the determination in step S3 is positive, a first ignition correction is carried out (step S7). The first ignition correction is a correction of each ignition timing for ensuring the torque generated in each of the rich and lean cylinders.

Figure 3:
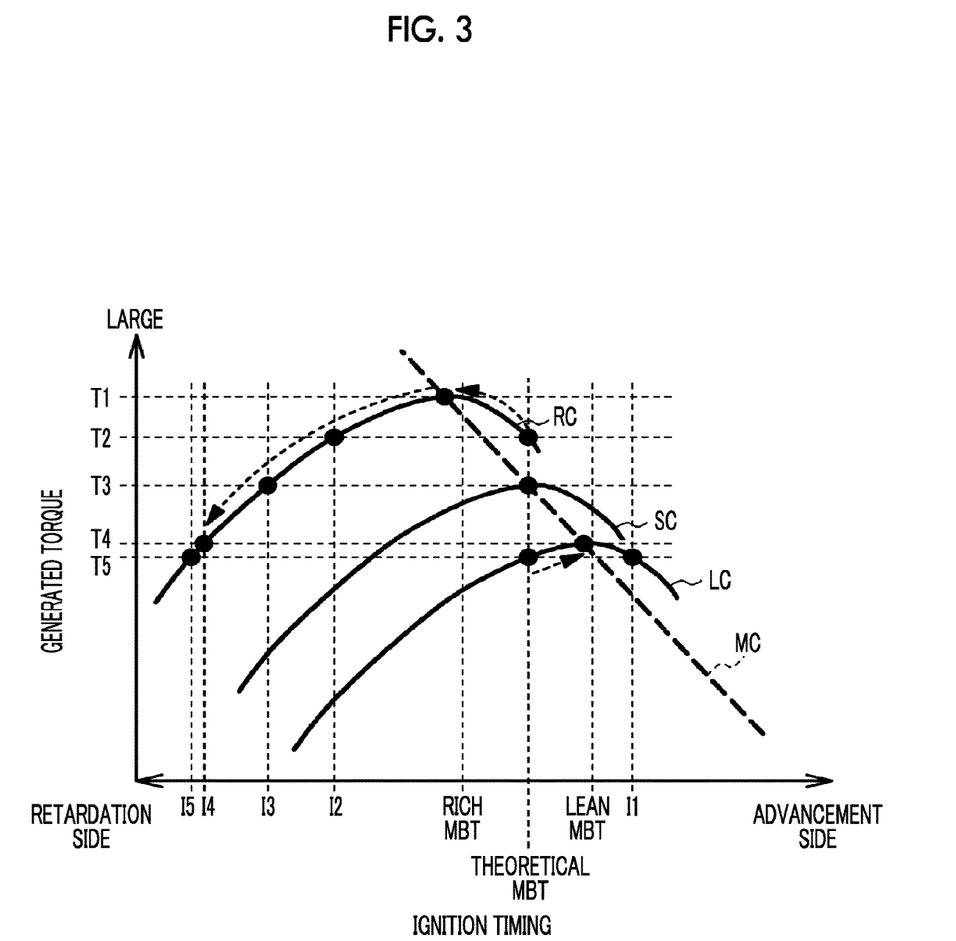
FIG. 3 is an exemplary map for correcting an ignition timing in the control apparatus.

The first ignition correction will be described. FIG. 3 is an exemplary map for correcting the ignition timing. This map is acquired in advance through an experiment, and is stored in the memory of the ECU 50. The axis of abscissa represents the ignition timing, the right side from the theoretical MBT indicates the advancement side, and the left side from the theoretical MBT indicates the retardation side. The axis of ordinate represents the torque generated in each of the cylinders. Curves SC, RC, and LC indicate the torque generated in each of the cylinders whose air-fuel ratio is controlled to the theoretical air-fuel ratio, the torque generated in the rich cylinder #1, and the torque generated in each of the lean cylinders #2 to #4, respectively. Each of these generated torques corresponds to the ignition timing. In the map of FIG. 3, for the sake of easy understanding, the theoretical MBT, a lean MBT, a rich MBT, ignition timings I1 to I5, and torques T1 to T5 are shown. The ignition timing is advanced in the sequence of the theoretical MBT, the lean MBT, and the ignition timing I1, and is retarded in the sequence of the theoretical MBT, the rich MBT, and the ignition timings I2 to I5. The torques T1 to T5 decrease in this sequence. Incidentally, the map of FIG. 3 is a map in which the rotational speed of the engine 20 and the load of the engine 20 are in a predetermined state. A plurality of maps for respective rotational speeds of the engine 20 and respective loads of the engine 20 are stored in the memory of the ECU 50. Besides, although only the single curve RC and only the single curve LC are shown in FIG. 3, the same number of curves as the number of ratios of increase/decrease to be controlled as described above are actually prescribed.

The theoretical MBT is the ignition timing at which the torque generated in the cylinder at the theoretical air-fuel ratio assumes the torque T3 as its maximum as described above. In other words, the torque T3 is an example of the maximum theoretical generated torque as a maximum of the torque generated in each of the cylinders in controlling the air-fuel ratio to the theoretical air-fuel ratio. The rich MBT is an ignition timing at which the torque generated in the rich cylinder #1 assumes the torque T1 as its maximum. The lean MBT is an ignition timing at which the torque generated in each of the lean cylinders #2 to #4 assumes the torque T4 as its maximum. The torque generated in the case where the ignition timing in the rich cylinder #1 is set to the theoretical MBT is equal to the torque T2, which is smaller than the torque T1. Each of the torques generated in the case where the ignition timing of each of the lean cylinders #2 to #4 is set to the theoretical MBT assumes the torque T5, which is smaller than the torque T4. The ignition timing I1 is an ignition timing that is advanced from the lean MBT and at which the torque generated in each of the lean cylinders #2 to #4 is equal to the torque T5. The ignition timings I2 to I5 are ignition timings at which the torque generated in the rich cylinder #1 is equal to the torques T2 to T5 respectively. Besides, a straight line MC is a line segment that passes the maximum value of the generated torque corresponding to each air-fuel ratio, and indicates the MBT as a general term including the theoretical MBT, the rich MBT, and the lean MBT. As indicated by the curves SC, RC, and LC, regardless of the value of the air-fuel ratio, the amount of decrease in torque in the case where the ignition timing is offset from the MBT by the same angle is larger when the ignition timing is offset from the MBT toward the advancement side than when the ignition timing is offset from the MBT toward the retardation side.

Figure 4A:
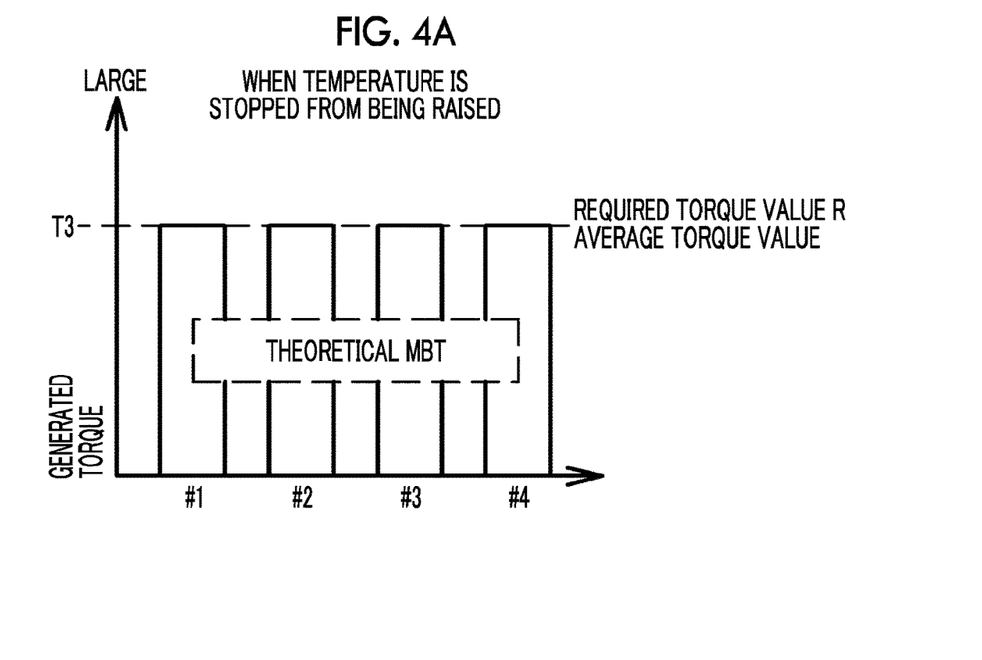
FIG. 4A is an exemplary graph showing torques generated in respective cylinders of the internal combustion engine while the temperature of a catalyst is stopped from being raised.
Figure 4B:
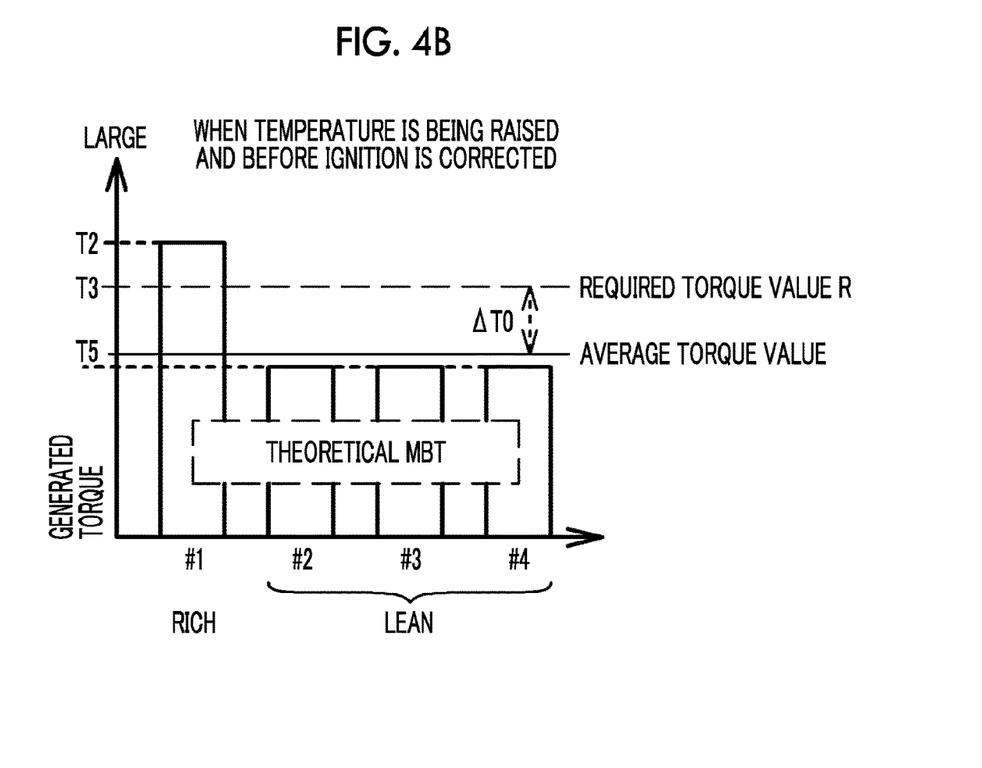
FIG. 4B is an exemplary graph showing torques generated in the respective cylinders of the internal combustion engine while the temperature of the catalyst is being raised and before the ignition of the internal combustion engine is corrected.
Figure 4C:
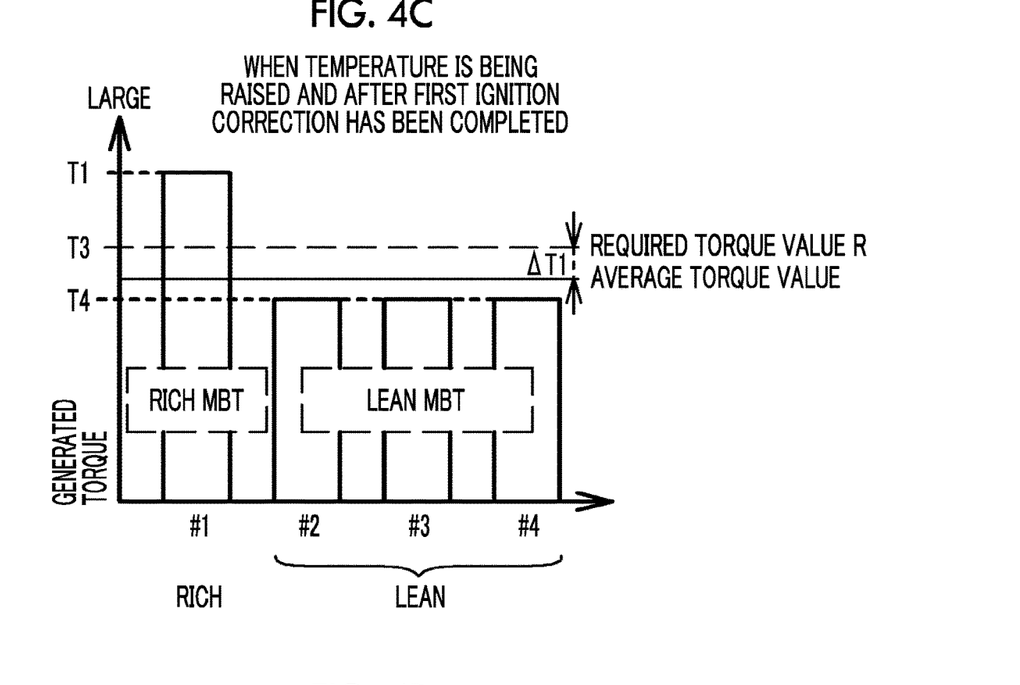
FIG. 4C is an exemplary graph showing torques generated in the respective cylinders of the internal combustion engine while the temperature of the catalyst is being raised and after first ignition correction of the internal combustion engine has been completed.
Figure 4D:
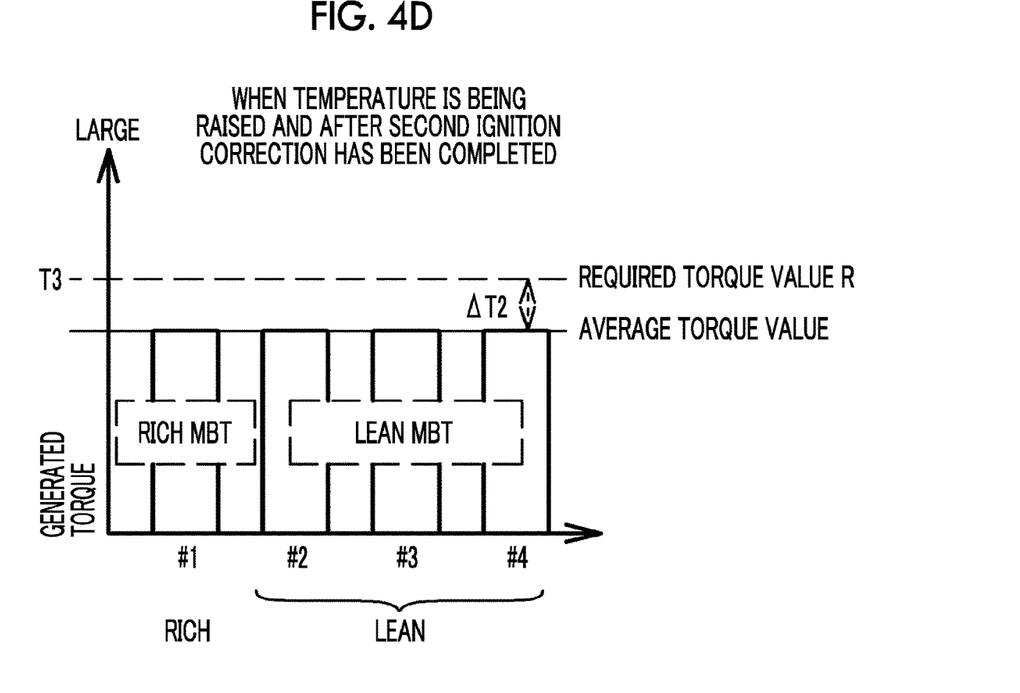
FIG. 4D is an exemplary graph showing torques generated in the respective cylinders of the internal combustion engine while the temperature of the catalyst is being raised and after second ignition correction of the internal combustion engine has been completed.

FIGS. 4A to 4D are exemplary graphs indicating the torques generated in the cylinders #1 to #4 respectively. FIG. 4A is a graph in the normal operating state during stop of the temperature raising process. FIG. 4B is a graph in a state where the temperature raising process is being executed and the first ignition correction is not carried out. FIG. 4C is a graph in a state where the temperature raising process is being executed and the first ignition correction has been carried out. Incidentally, FIG. 4D is a graph in a state where the temperature raising process is being executed and a second ignition correction that will be described later has been carried out in addition to the first ignition correction. The details of this graph will be described later.

In each of FIGS. 4A to 4D, a required torque value R that is required of the engine 20 based on a detection value of the accelerator depression amount sensor 11 or the like, and an average torque value as an average of the generated torques are shown. Besides, in FIGS. 4B to 4D, amounts $\Delta T0$ to $\Delta T2$ of decrease in the average torque values from the required torque value R are shown respectively. In each of the states of FIGS. 4A to 4D, the operating state that is required of the engine 20 through the operation by the driver is the same, and the required torque value R assumes the same value. Besides, in FIGS. 4A to 4D, the torques T1 to T5 shown in the example of FIG. 3 are shown as appropriate.

As shown in FIG. 4A, in the normal operating state during stop of the temperature raising process, the average torque value coincides with the required torque value R, and the throttle opening degree and the fuel injection amount are controlled in advance in this manner. In this case, the average torque value and the required torque value R are equal to the torque T3 in the example of FIG. 3.

In contrast, when the temperature raising process is being executed and the first ignition correction is not carried out, any one of the ignition timings of the rich cylinder #1 and the lean cylinders #2 to #4 is controlled to the theoretical MBT, the torque generated in the rich cylinder #1 is equal to the torque T2, and the torque generated in each of the lean cylinders #2 to #4 is equal to the torque T5, as shown in FIGS. 3 and 4B. Besides, as shown in FIG. 4B, the average torque value decreases from the required torque value R by the amount $\Delta T0$ of decrease. This is because the difference between the torque T2 and the torque T3 that is equivalent to an increase in the torque generated in the rich cylinder #1 is smaller than the difference between the torque T3 and the torque T5 that is equivalent to a decrease in the torque generated in each of the lean cylinders #2 to #4, and furthermore, because of the single rich cylinder #1 and the three lean cylinders #2 to #4.

By carrying out the first ignition correction, the ignition timing of the rich cylinder #1 is corrected to the rich MBT, and the ignition timing of each of the lean cylinders #2 to #4 is corrected to the lean MBT. Therefore, as shown in FIGS. 3 and 4C, the torque generated in the rich cylinder #1 increases from the torque T2 to the torque T1, and the torque generated in each of the lean cylinders #2 to #4 increases from the torque T5 to the torque T4. Therefore, the amount of decrease in torque becomes equal to the amount $\Delta T1$ of decrease, which is smaller than the amount $\Delta T0$ of decrease. As a result, the output of the engine 20 is restrained from decreasing as the temperature raising process is executed, and the deterioration in fuel economy is suppressed. Incidentally, when the first ignition correction is carried out, a first ignition correction flag is turned ON. Then, if the result of the determination in step S3 is negative after the present control is performed again, the first ignition correction is stopped, and the first ignition correction flag is turned OFF. Besides, as shown in FIG. 4C, even when the first ignition correction is carried out, the average torque value remains smaller than the required torque value R. This point will be described later.

In the aforementioned first ignition correction, the ignition timing of the rich cylinder #1 is corrected to the rich MBT, and the ignition timing of each of the lean cylinders #2 to #4 is corrected to the lean MBT, but the disclosure is not limited thereto. For example, the ignition timing of the rich cylinder #1 may be corrected toward the retardation side from the theoretical MBT within such a range that the torque generated in the rich cylinder #1 exceeds the torque T2. In concrete terms, the ignition timing of the rich cylinder #1 may be corrected to a section from the theoretical MBT to the ignition timing I2 that does not include the theoretical MBT or the ignition timing I2. This is because if only the generated torque is increased above the generated torque in the case where the ignition timing in the rich cylinder #1 is set to the theoretical MBT, the output of the engine 20 can be restrained from decreasing as the temperature raising process is executed, and the deterioration in fuel economy can be suppressed. By the same token, the ignition timing of each of the lean cylinders #2 to #4 may be corrected toward the advancement side from the theoretical MBT within such a range that the torque generated in each of the lean cylinders #2 to #4 exceeds the torque T5. In concrete terms, the ignition timing of each of the lean cylinders #2 to #4 may be corrected to a section from the theoretical MBT to the ignition timing I1 that does not include the theoretical MBT or the ignition timing I1. In this case as well, this is because if only each of the generated torques is increased above the generated torque in the case where the ignition timing in each of the lean cylinders #2 to #4 is set to the theoretical MBT, the output of the engine 20 can be restrained from decreasing as the temperature raising process is executed, and the deterioration in fuel economy can be suppressed.

Incidentally, the process of step S7 is an exemplary process that is executed by the first ignition correction unit that corrects the ignition timing in the rich cylinder #1 toward the retardation side from the theoretical MBT such that the torque generated in the rich cylinder #1 exceeds the torque T2 generated in the rich cylinder at the theoretical MBT, and that corrects the ignition timing in each of the lean cylinders #2 to #4 toward the advancement side from the theoretical MBT such that the torque generated in each of the lean cylinders #2 to #4 exceeds the torque generated in each of the lean cylinders #2 to #4, when the temperature raising process is being executed.

Subsequently, it is determined, based on a detection value from the coolant temperature sensor 29, whether or not the engine 20 is in a cold state (step S9). In concrete terms, when the temperature of coolant as the detection value of the coolant temperature sensor 29 is equal to or lower than a predetermined temperature, it is determined that the engine 20 is in the cold state. In the case where the temperature raising process is executed when the engine 20 is in the cold state, the temperature of the three-way catalyst 31 is promptly raised to its activation temperature at the time of cold start of the engine 20. Besides, in the case where the temperature raising process is executed when the engine 20 is not in the cold state, the temperature of the three-way catalyst 31 is raised to its regeneration temperature.

If the result of the determination in step S9 is positive, a cold ignition correction for correcting the ignition timing based on the detection value of the coolant temperature sensor 29, namely, the temperature of coolant is carried out (step S11). It should be noted herein that the MBT in the cold state is offset toward the advancement side from the MBT in a non-cold state. This is because the temperature of the engine 20 is low in the cold state, the combustion speed of fuel hence decreases, and the MBT is offset toward the advancement side correspondingly. Besides, the degree of decrease in the combustion speed of fuel increases as the air-fuel ratio shifts toward the lean side. Accordingly, the ignition timing of the rich cylinder #1 is corrected to the rich MBT in the cold state, and the ignition timing of each of the lean cylinders #2 to #4 is corrected to the lean MBT in the cold state, based on a map or calculation formula that is prescribed such that the amount of correction of the ignition timing toward the advancement side increases as the temperature of coolant decreases and as the air-fuel ratio shifts toward the lean side. Thus, the generated torque is restrained from decreasing even in the cold state. If the result of the determination in step S9 is negative, the aforementioned cold ignition correction is not carried out.

Incidentally, a process similar to step S9 and step S11 is not executed after the execution of the process of step S5, because the temperature raising process is executed to warm up the three-way catalyst 31 in the cold state and the engine 20 is often in the non-cold state or has already exited the cold state when the temperature raising process is stopped. Incidentally, the foregoing description is not meant to exclude the execution of step S9 and step S11 after the execution of step S5.

Subsequently, it is determined whether or not the engine 20 is in a low-load operating state (step S13). The low-load operating state is equivalent to, for example, an idling operating state or an operating state where the vehicle runs downhill. In concrete terms, when the amount of intake air indicated by the detection value of the airflow meter 15 is equal to or smaller than a predetermined amount, it is determined that the engine 20 is in the low-load operating state. If the result of the determination in step S13 is positive, the second ignition correction is carried out (step S15). If the result of the determination in step S13 is negative, the second ignition correction is not carried out.

Incidentally, if the result of the determination in step S13 is positive, a low-load determination flag is turned ON. If the result of the determination in step S3 or step S13 is negative after the present control is performed again from step S1, the low-load determination flag is turned OFF. Besides, when the second ignition correction is carried out, the second ignition correction flag is turned ON. If the result of the determination in step S3 or S13 is negative after the present control is performed again from step S1, the second ignition correction is not carried out, and the second ignition correction flag is turned OFF.

The second ignition correction will be described using FIGS. 3 and 4D. In the second ignition correction, as shown in FIG. 3, the ignition timing of the rich cylinder #1 is corrected further toward the retardation side from the rich MBT, and is corrected to the ignition timing I4 at which the same torque as the maximum torque T4 among the torques generated in the respective lean cylinders #2 to #4 is equal to the torque generated in the rich cylinder #1. Thus, as shown in FIG. 4D, the torque is restrained from fluctuating among the rich cylinder #1 and the lean cylinders #2 to #4.

Consequently, the engine 20 is restrained from vibrating as a result of the temperature raising process, and the deterioration in drivability is suppressed.

Besides, as shown in FIG. 4D, the amount ΔT2 of decrease obtained by carrying out the second ignition correction further increases above the amount ΔT1 of decrease at the time when the first ignition correction is carried out. In the low-load operating state, the amount of fuel consumption is small in the first place, so the influence on the deterioration in fuel economy is small. Besides, in both the first ignition correction and the second ignition correction, only the ignition timing is corrected, and the amount of fuel injection is not reduced. Therefore, the execution of the temperature raising process is also restrained from adversely affecting the temperature raising property of the three-way catalyst 31.

In the second ignition correction, the ignition timing of the rich cylinder #1 is not absolutely required to be corrected to the ignition timing I4. In concrete terms, the ignition timing of the rich cylinder #1 may be corrected to a section from the ignition timing I3 to the ignition timing I5. This is because the difference between the torque generated in the rich cylinder #1 and the torque generated in each of the lean cylinders #2 to #4 can be made small, and the deterioration in drivability can be suppressed, when the ignition timing of the rich cylinder #1 is corrected to a timing within this section. Besides, the ignition timing of the rich cylinder #1 may be corrected to a timing from the ignition timing I3 to the ignition timing I4. This is because the output of the engine 20 can be ensured and the deterioration in fuel economy can also be suppressed by thus preventing the torque generated in the rich cylinder #1 from decreasing too much. Accordingly, for example, the ignition timing of the rich cylinder #1 may be corrected to a timing when the suppression of the deterioration in drivability and the suppression of the deterioration in fuel economy can be made compatible with each other in the low-load operating state, within the section from the ignition timing I3 to the ignition timing I4. Besides, in the case where the ignition timing of each of the lean cylinders #2 to #4 is corrected to a section from the theoretical MBT to the ignition timing I1, the ignition timing of the rich cylinder #1 may be corrected such that the torque generated in the rich cylinder #1 coincides with the torque generated in each of the lean cylinders #2 to #4, from the standpoint of suppressing the deterioration in drivability.

Incidentally, in the second ignition correction, it is also conceivable to make the difference between the torque generated in the rich cylinder #1 and the torque generated in each of the lean cylinders #2 to #4 small by correcting the ignition timing of the rich cylinder #1 toward the advancement side from the theoretical MBT instead of correcting the ignition timing of the rich cylinder #1 toward the retardation side from the theoretical MBT. However, when the ignition timing of the rich cylinder #1 is greatly corrected toward the advancement side to such an extent that the difference between the generated torques becomes small, the volume of noise may increase as a result of the occurrence of misfire and combustion. Therefore, the occurrence of misfire is suppressed, and the volume of noise is also restrained from increasing as a result of combustion, by correcting the ignition timing of the rich cylinder #1 toward the retardation side.

The process of step S15 is an exemplary process that is executed by the second ignition correction unit that corrects the ignition timing in the rich cylinder #1 further toward the retardation side such that the torque generated in the rich cylinder #1 becomes equal to or smaller than the torque T3 and the torque generated in each of the lean cylinders #2 to #4 at the theoretical MBT becomes equal to or larger than the torque T5, in addition to the correction in step S7, when the temperature raising process is being executed and the engine 20 is in the low-load operating state.

Subsequently, the throttle opening degree correction for correcting the throttle opening degree in an increasing manner is carried out (step S17). The throttle opening degree correction is a process for compensating for a decrease in the output of the engine 20 resulting from the execution of the temperature raising process. By executing this process, the torque can be restrained from decreasing as a result of the execution of the temperature raising process, and the deterioration in fuel economy is suppressed. The present control ends after the execution of the process of step S17. The process of step S17 is an exemplary process that is executed by the throttle opening degree correction unit that corrects the throttle opening degree of the engine 20 in an increasing manner more when the temperature raising process is being executed than when the temperature 1 raising process is stopped. The details of the throttle opening degree correction will be described later.

As described above, the first ignition correction and the second ignition correction are carried out when the engine 20 is in the low-load operating state during the execution of the temperature raising process, and only the first ignition correction is carried out when the engine 20 is not in the low-load operating state during the execution of the temperature raising process. In the low-load operating state, the driver is likely to recognize vibrations of the engine 20 resulting from the execution of the temperature raising process, and the influence on the deterioration in drivability by the temperature raising process is greater than the influence on the deterioration in fuel economy by the temperature raising process. Therefore, in the low-load operating state, the first ignition correction and the second ignition correction are carried out, with higher priority given to drivability. On the other hand, when the engine 20 is not in the low-load operating state, for example, when the engine 20 is in an intermediate-load operating state or a high-load operating state with the vehicle 1 running at high speed, the driver is considered to be less likely to recognize vibrations of the engine 20 resulting from the execution of the temperature raising process than in the case where the engine 20 is in the low-load operating state. Besides, in the intermediate-load operating state or the high-load operating state, it is desirable to ensure a sufficient output of the engine 20 and suppress the deterioration in fuel economy. Therefore, when the engine 20 is not in the low-load operating state during the execution of the temperature raising process, the first ignition correction is carried out with higher priority given to fuel economy. As described above, the deterioration in fuel economy is suppressed while suppressing the deterioration in drivability.

Figure 5:
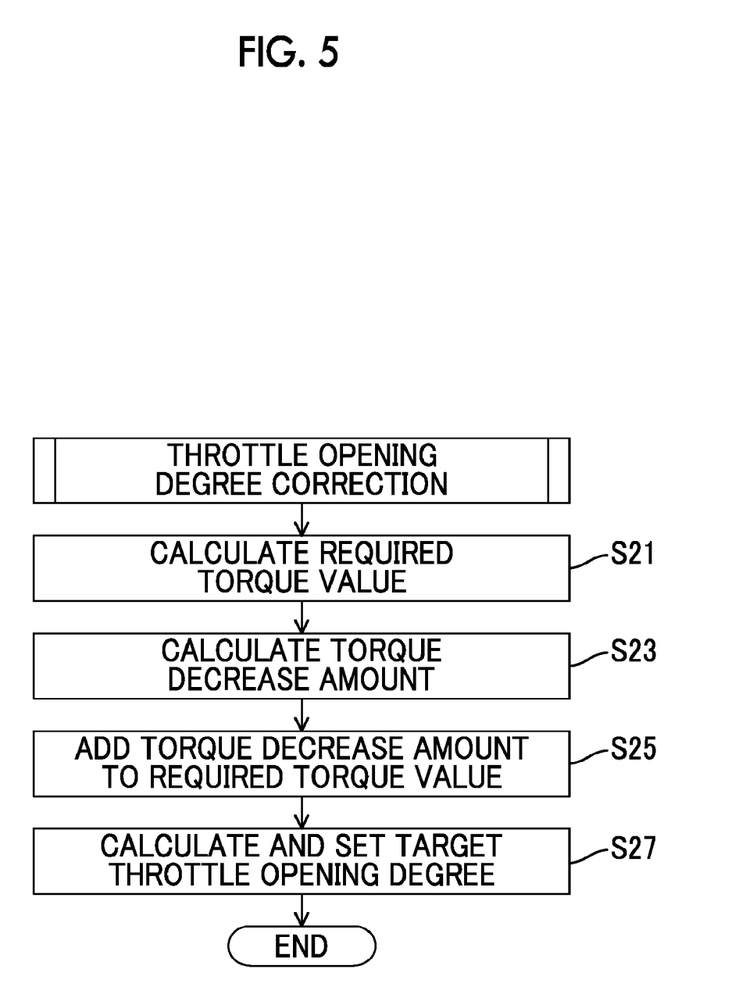
FIG. 5 is a flowchart showing an exemplary throttle opening degree correction that is carried out by the ECU.

Next, the concrete contents of the throttle opening degree correction will be described with reference to FIGS. 4C, 4D, and 5. FIG. 5 is a flowchart showing an example of the throttle opening degree correction that is carried out by the ECU 50.

First of all, a required torque value as a value of the torque required of the engine 20 is calculated based on a rotational speed of the engine 20 and a detection value of the accelerator depression amount sensor 11 (step S21). Subsequently, an amount of decrease in an average torque value for the required torque value through the execution of the temperature raising process is calculated (step S23). In concrete terms, when only the first ignition correction is carried out, the amount of decrease is calculated based on a first decrease amount map prescribing an amount of decrease through the execution of only the first ignition correction. When both the first ignition correction and the second ignition correction are carried out, the amount of decrease is calculated based on a second decrease amount map prescribing an amount of decrease through the execution of both the first ignition correction and the second ignition correction. The amount ΔT1 of decrease is calculated in an example of FIG. 4C, and the amount ΔT2 of decrease is calculated in an example of FIG. 4D. It is determined, based on the above-mentioned first ignition correction flag and the above-mentioned second ignition correction flag, whether or not the first ignition correction and the second ignition correction are carried out, respectively.

The first decrease amount map and the second decrease amount map are calculated in advance through an experiment and stored in the memory of the ECU 50. Each of this first decrease amount map and this second decrease amount map is a three-dimensional map in which the amount of decrease is associated with the rotational speed of the engine 20, the load of the engine 20, and the ratio of increase in the amount of fuel injection in the rich cylinder #1. In each of these maps, the amount of decrease is prescribed in such a manner as to increase, for example, as the rotational speed of the engine 20 rises, as the load of the engine 20 increases, and as the ratio of increase increases.

Incidentally, in each of the aforementioned maps, the amount of decrease is associated with the ratio of increase in the amount of fuel injection. Each of the aforementioned maps does not prescribe only the amount of decrease in the torque generated in the rich cylinder #1, but prescribes the amount of decrease in the average torque value as the average of the torques generated in all the cylinders from the required torque value.

Besides, when the above-mentioned ratio of increase in the amount of fuel injection for the control to the rich cylinder #1 is determined, the ratio of decrease for the control to each of the lean cylinders #2 to #4 is also uniformly determined. Therefore, each of the aforementioned maps is not absolutely required to be prescribed for each ratio of increase, but may be prescribed for, for example, each ratio of decrease or each sum of the ratio of increase and the ratio of decrease. Besides, in the case where the air-fuel ratio in the temperature raising process is not controlled by changing the ratio of increase/decrease in the amount of fuel injection but the target air-fuel ratio of each of the cylinders is directly changed to a rich air-fuel ratio or a lean air-fuel ratio, the amount of decrease may be associated with each rich air-fuel ratio or each lean air-fuel ratio.

Figure 6:
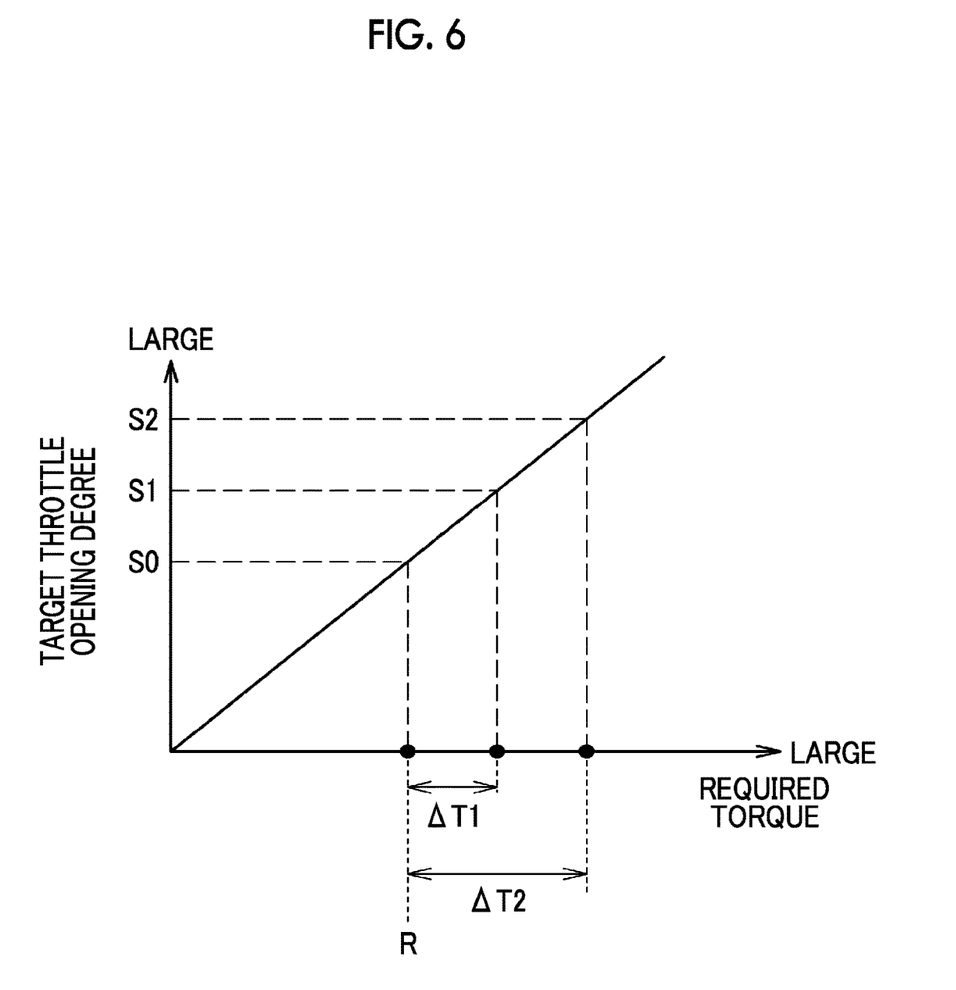
FIG. 6 is an exemplary map prescribing a target throttle opening degree corresponding to a required torque of the internal combustion engine.

Subsequently, the calculated amount of decrease in the generated torque is added to the required torque value (step S25). Subsequently, a target throttle opening degree corresponding to the added value is calculated and set (step S27). FIG. 6 is an exemplary map prescribing the target throttle opening degree corresponding to the required torque. The axis of abscissa represents the required torque, and the axis of ordinate represents the target throttle opening degree. This map is acquired in advance through an experiment, and is stored in the memory of the ECU 50. This map is utilized not only when the temperature raising process is being executed, but is used also during the stop of the temperature raising process so as to calculate and set the target throttle opening degree. In the example of FIG. 6, a target throttle opening degree S0 corresponding to the required torque value R is set when the temperature raising process is stopped as shown in FIG. 4A. When the temperature raising process is executed and the first ignition correction has been carried out, a target throttle opening degree S1 corresponding to a value obtained by adding the amount ΔT1 of decrease shown in FIG. 4C to the required torque value R is calculated and set. When the temperature raising process is being executed and the second ignition correction has been carried out, a target throttle opening degree S2 corresponding to a value obtained by adding the amount ΔT2 of decrease shown in FIG. 4D to the required torque value R is calculated and set. The amount ΔT2 of decrease is larger than the amount ΔT1 of decrease as described above, so the calculated target throttle opening degree S2 is larger than the target throttle opening degree S1. By setting the throttle opening degree to the target throttle opening degree thus calculated, the decrease in the output of the engine 20 resulting from the execution of the temperature raising process is compensated for. Furthermore, the occurrence of torque shock can also be suppressed when the execution of the temperature raising process is started or stopped.

Figure 7:
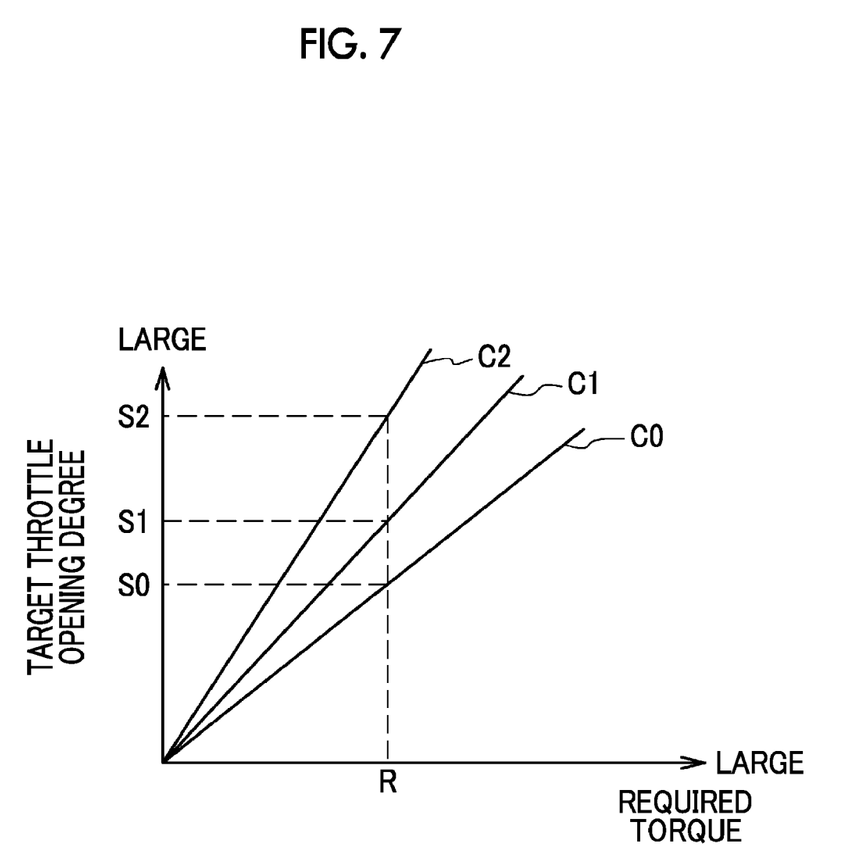
FIG. 7 is a modification example of the map prescribing the target throttle opening degree corresponding to the required torque of the internal combustion engine.

Next, a modification example of the throttle opening degree correction will be described. In the modification example of the throttle opening degree correction, the target throttle opening degree is directly calculated from the required torque value and set, without executing the processes of step S23 and step S25. FIG. 7 is a modification example of the map prescribing the target throttle opening degree corresponding to the required torque. In FIG. 7, the axis of abscissa represents the required torque, and the axis of ordinate represents the target throttle opening degree. This map is acquired in advance through an experiment, and is stored in the memory of the ECU 50. This map is also utilized not only when the temperature raising process is being executed, but is used also during the stop of the temperature raising process so as to calculate and set the target throttle opening degree. A straight line C0 is a line segment prescribing the target throttle opening degree corresponding to the required torque during the stop of the temperature raising process. A straight line C1 is a line segment prescribing the target throttle opening degree corresponding to the required torque in a state where the temperature raising process is being executed and the first ignition correction has been carried out. A straight line C2 is a line segment prescribing the target throttle opening degree corresponding to the required torque in a state where the temperature raising process is being executed and both the first ignition correction and the second ignition correction have been carried out. Each of the straight lines C1 and C2 is prescribed such that the throttle opening degree becomes equal to the target throttle opening degree that takes each of the amounts ΔT1 and ΔT2 of decrease into account in advance. Accordingly, for example, in the case of the required torque value R, the target throttle opening degrees S0 to S2 are calculated according to the straight lines C0 to C2 respectively. Incidentally, the target throttle opening degree S1 and the target throttle opening degree S2 can thus be directly calculated from the required torque value R, so the processing load of the ECU 50 is reduced.

Figure 8:
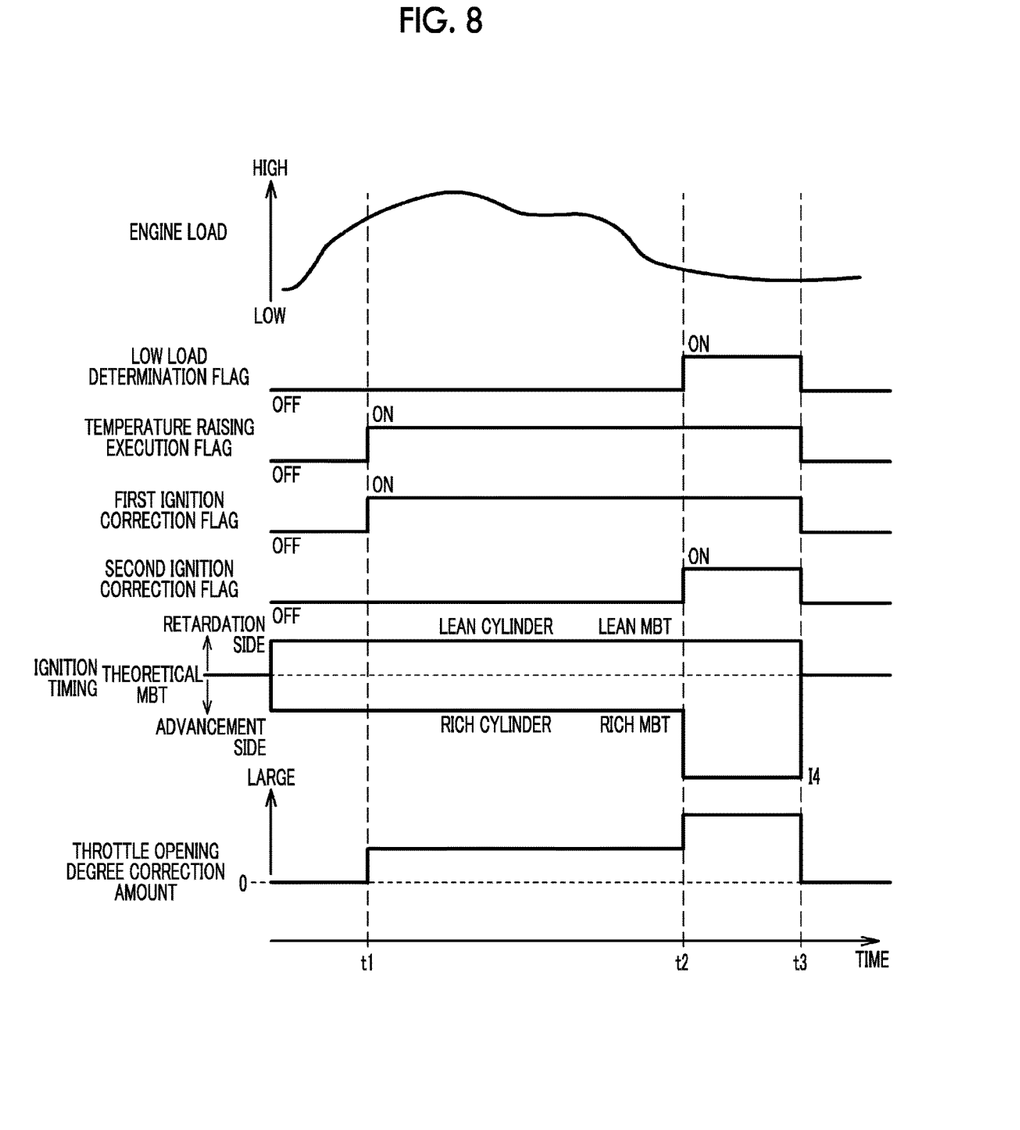
FIG. 8 is an exemplary timing chart showing a case where a temperature raising process for the catalyst is executed in the control apparatus.

FIG. 8 is an exemplary timing chart showing a case where the temperature raising process is executed. In the present timing chart, the load of the engine 20, the low-load determination flag, the temperature raising execution flag, the first ignition correction flag, the second ignition correction flag, the ignition timing, and the throttle opening degree correction amount are shown. The throttle opening degree correction amount represents an amount of increase in the throttle opening degree after the correction of the throttle opening degree in the case where the throttle opening degree correction has not been carried out. Incidentally, the timing chart of FIG. 8 is made to correspond to FIG. 3.

When the temperature raising execution flag is switched from OFF to ON at a time point t1, the ignition timing in the rich cylinder #1 is corrected to the rich MBT, the ignition timing in each of the lean cylinders #2 to #4 is corrected to the lean MBT, and the first ignition correction flag is switched from OFF to ON. Besides, at the time point t1, the engine 20 is in the high-load operating state, and the low-load determination flag is held OFF. Besides, the throttle opening degree correction amount is also increased by an opening degree corresponding to the amount of decrease in the generated torque corresponding to the first ignition correction. Therefore, the temperature raising process is continued while restraining the torque of the engine 20 in the high-load operating state from decreasing.

When the engine 20 enters the low-load operating state at a time point t2 while the temperature raising execution flag is held ON, the low-load determination flag is switched from OFF to ON, and the second ignition correction flag is switched from OFF to ON. Thus, the ignition timing of the rich cylinder #1 is further retarded and set to the ignition timing I4. Besides, the throttle opening degree correction amount is also further increased by an opening degree corresponding to the amount of decrease in the generated torque corresponding to the first ignition correction and the second ignition correction. Thus, the temperature raising process is continued while suppressing the deterioration in drivability.

When the temperature raising process is stopped at a time point t3, the temperature raising execution flag is switched from ON to OFF, and the low-load determination flag, the first ignition correction flag, and the second ignition correction flag are switched from ON to OFF. Besides, the throttle opening degree correction amount is also returned to zero.

In the manner described above, while the deterioration in drivability is suppressed by correcting the ignition timing, the deterioration in fuel economy is also suppressed, and the output of the engine 20 is also restrained from decreasing through the execution of the temperature raising process, by further correcting the throttle opening degree.

Although the embodiment of the disclosure has been described above in detail, the disclosure is not limited to this specific embodiment thereof, but can be subjected to various modifications and alterations within the scope of the disclosure set forth in the claims.

In the aforementioned embodiment of the disclosure, the rich air-fuel ratio and the lean air-fuel ratio are realized in the temperature raising process, by correcting the amount of fuel injection that realizes the target air-fuel ratio in an increasing manner or a decreasing manner, but the disclosure is not limited thereto. That is, in the temperature raising process, the target air-fuel ratio of one of the cylinders may be set to the rich air-fuel ratio, and the target air-fuel ratio of each of the other remaining cylinders may be directly set to the lean air-fuel ratio.

In the aforementioned embodiment of the disclosure, the in-line four-cylinder engine has been described as an example of the internal combustion engine. However, this internal combustion engine may be a V-type multi-cylinder engine having a catalyst for each of its banks. In this case, according to the temperature raising process, at least one of the plurality of the cylinders in each of the banks is controlled to the rich cylinder, and each of the other remaining cylinders is controlled to the lean cylinder. In this case, with a view to restraining the torque from fluctuating between the banks, the numbers of cylinders controlled to the rich and lean cylinders in one of the banks and the numbers of cylinders controlled to the rich and lean cylinders in the other bank are desired to be equal to each other respectively, the air-fuel ratio and ignition timing in each rich cylinder in one of the banks and the air-fuel ratio and ignition timing in each rich cylinder in the other bank are also desired to be equal to each other respectively, and the air-fuel ratio and ignition timing in each lean cylinder in one of the banks and the air-fuel ratio and ignition timing in each lean cylinder in the other bank are also desired to be equal to each other respectively.

What is claimed is:

1. A control apparatus for an internal combustion engine, comprising:
    an electronic control unit configured to:
    (i) calculate a theoretical ignition timing, the theoretical ignition timing being an ignition timing when a torque generated in each of cylinders belonging to the internal combustion engine as a motive power source of a vehicle is equal to a maximum theoretical generated torque when an air-fuel ratio of each of the cylinders is controlled to a theoretical air-fuel ratio,
    (ii) control at least one of the plurality of the cylinders to a rich cylinder whose air-fuel ratio is equal to a rich air-fuel ratio that is smaller than the theoretical air-fuel ratio, control the cylinders other than the at least one of the plurality of the cylinders to lean cylinders whose air-fuel ratio is equal to a lean air-fuel ratio that is larger than the theoretical air-fuel ratio, and determine whether or not a temperature raising process for raising a temperature of a catalyst that purifies exhaust gas is being executed,
    (iii) execute a first ignition correction when the temperature raising process is being executed, the first ignition correction being a correction for correcting an ignition timing in the rich cylinder toward a retardation side from the theoretical ignition timing such that the torque generated in the rich cylinder exceeds the torque generated in the rich cylinder at the theoretical ignition timing, and correcting an ignition timing in each of the lean cylinders toward an advancement side from the theoretical ignition timing such that the torque generated in each of the lean cylinders exceeds the torque generated in each of the lean cylinders at the theoretical ignition timing, and
    (iv) execute a second ignition correction when the temperature raising process is being executed and the internal combustion engine is in a low-load operating state, the second ignition correction being a correction for correcting the ignition timing in the rich cylinder further toward the retardation side such that the torque generated in the rich cylinder becomes equal to or smaller than the maximum theoretical generated torque and equal to or larger than the torque generated in each of the lean cylinders at the theoretical ignition timing, in addition to the correction according to the first ignition correction.

2. The control apparatus according to claim 1, wherein
the electronic control unit is configured to correct the ignition timing in the rich cylinder such that the torque generated in each of the lean cylinders in which the ignition timing is corrected through the first ignition correction coincides with the torque generated in the rich cylinder, in the second ignition correction.

3. The control apparatus according to claim 1, wherein
the electronic control unit is configured to execute a correction for increasing an opening degree of a throttle of the internal combustion engine more when the temperature raising process is being executed than when the temperature raising process is stopped.

4. The control apparatus according to claim 3, wherein
the electronic control unit is configured to more greatly correct an amount of increase in the opening degree of the throttle in a case of the low-load operating state than in a case other than the low-load operating state.

5. The control apparatus according to according to claim 1, wherein
the electronic control unit is configured to correct the ignition timing in each of the lean cylinders to an ignition timing at which the torque generated in each of the lean cylinders is maximized, in the first ignition correction.

6. The control apparatus according to according to claim 1, wherein
the electronic control unit is configured to correct the ignition timing in the rich cylinder to an ignition timing at which the torque generated in the rich cylinder is maximized, in the first ignition correction.

* * * * *